United States Patent [19]

Yasuda et al.

[11] Patent Number: 4,462,101
[45] Date of Patent: Jul. 24, 1984

[54] MAXIMUM LIKELIHOOD ERROR CORRECTING TECHNIQUE

[75] Inventors: Yutaka Yasuda, Tanashi; Yasuo Hirata, Mitaka; Akira Ogawa, Machida, all of Japan

[73] Assignee: Kokusai Denshin Denwa Co., Ltd., Tokyo, Japan

[21] Appl. No.: 355,200

[22] Filed: Mar. 5, 1982

[30] Foreign Application Priority Data

Mar. 23, 1981 [JP] Japan .................. 56-40419

[51] Int. Cl.³ .................................... G06F 11/10
[52] U.S. Cl. ..................................... 371/43
[58] Field of Search ............... 371/43, 44, 45, 37

[56] References Cited

U.S. PATENT DOCUMENTS

| | | | |
|---|---|---|---|
| 3,373,404 | 3/1968 | Webb | 371/37 |
| 3,805,232 | 4/1974 | Allen | 371/37 |
| 4,291,406 | 9/1981 | Bahl et al. | 371/44 |
| 4,404,674 | 9/1983 | Rhodes | 371/43 |

OTHER PUBLICATIONS

E. R. Berlekamp, Algebraic Coding Theory, McGraw Hill, Inc., 1968, pp. 334-336.
*Punctured Convolutional Codes of Rate* (n-1)/n *and Simplified Maximum Likelihood Decoding*, by J. Bibb Cain, George C. Clark, Jr., and John M. Geist, in IEEE Translations on Information Theory, vol. IT-25, No. 1, Jan. 1979, pp. 97-100.

*Primary Examiner*—Charles E. Atkinson
*Attorney, Agent, or Firm*—Armstrong, Nikaido, Marmelstein & Kubovcik

[57] ABSTRACT

A maximum likelihood error correcting technique for a digital communication in which a transmit side provides coded data with some redundancy through a convolutional coding circuit, and a receive side corrects transmission errors automatically through a maximum likelihood error correcting circuit has been improved by deleting some symbols at a transmit side to increase a coding rate close to 1, and inserting dummy symbols at a receive side into each bit position where a symbol has been deleted at a transmit side. A likelihood value for that dummy symbol inserted at a receive side for the maximum likelihood decoding is a fixed predetermined value. Thus, both a coding circuit in a transmit side and a decoding circuit in a receiving circuit have only to handle original low rate code, while keeping a coding rate in a transmission line high. Then, the codec for high rate code obtained merely by adding the simple circuits to the simple codec for low rate code provides an excellent error correcting capability compared with other conventional error correcting techniques of the same coding rate.

4 Claims, 6 Drawing Figures

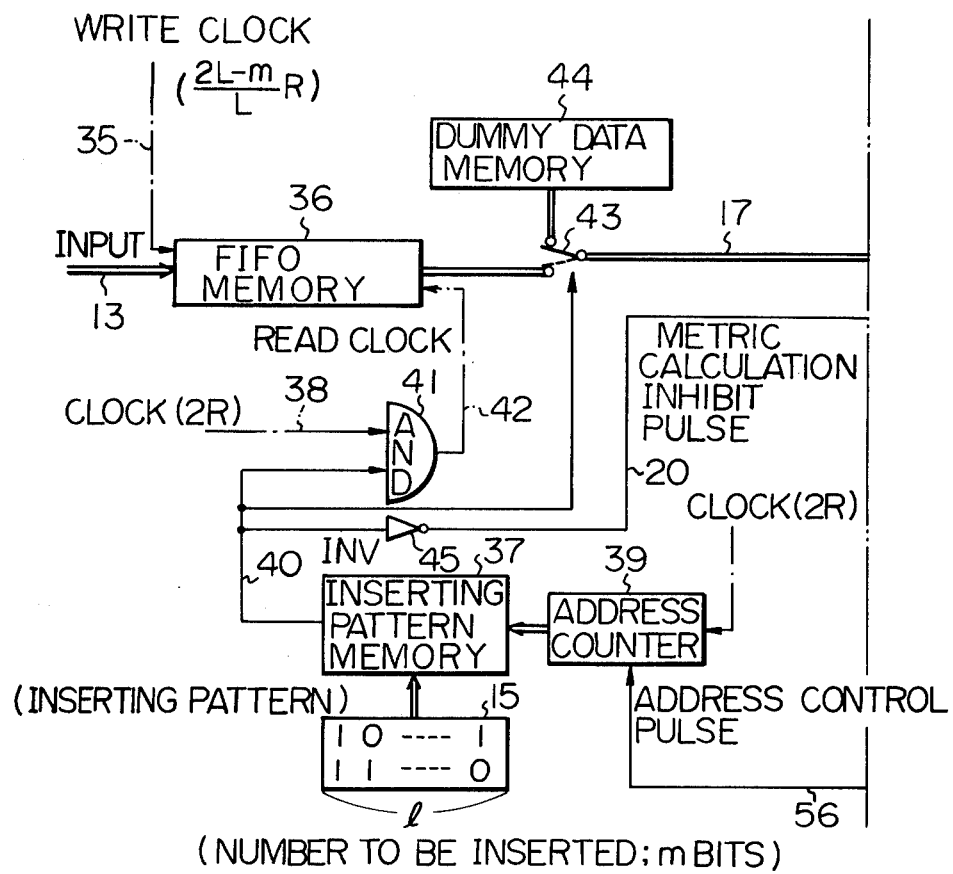

MAXIMUM LIKELIHOOD ERROR CORRECTING TECHNIQUE

BACKGROUND OF THE INVENTION

The present invention relates to an error correcting technique for reducing error bits in a digital communication system, in particular, relates to such a system utilizing a maximum likelihood error correcting technique.

In a recent digitalized communication system, an error correcting technique has been introduced for improving the communication quality. There have been known many error correcting techniques, and among them, the error correcting technique having the combination of the convolutional coding and the maximum likelihood decoding is very promising.

According to the maximum likelihood decoding technique, a receive side calculates a likelihood (which corresponds to the possibility that each symbol has been sent from a transmit side) for all possible symbols transmittable from a transmit side, according to the actual receive symbols at the receive side. Then, the receive side determines or presumes the symbol which has the maximum likelihood as the code which is possibly transmitted from the transmit side. In particular, the soft decision maximum likelihood decoding, in which a receive side gives a precise possibility to each symbol (0 or 1), then, a likelihood for a series of decoded symbols, is very effective in correcting the transmission errors.

However, when the length of the signal sequence to be transmitted is long, the number of the possible data pattern which the receive side must predict increases rapidly or exponentially, the capacity of the hardware for decoding circuit is not practical.

The Viterbi decoding technique has been known to solve the above problem. According to the Viterbi decoding circuit, the unnecessary calculation for the likelihood is removed, and it uses the algorithm for performing the maximum likelihood decoding effectively. The hardware for that Viterbi decoding technique has been realized for the convolutional coding/maximum likelihood decoding, for the code with the low coding rate and with the short constraint length.

A coding rate is defined as the ratio of the number of input bits to the number of output bits of the encoder, for instance, the coding rate is $\frac{1}{2}$ when the number of the output bits is 2 for each input bit. The difference of the number of the output bits and that of the input bits corresponds to the redundant bits of the coded signal sequence. When the coding rate is large, or is close to 1 (for instance $\frac{7}{8}$), the redundancy of the coded symbol is small, and the error correcting capability is small.

A code constraint length is defined as the length of the input signal for constructing each coded output bit.

It has been known that the amount of the hardware of the Viterbi decoder for decoding the coded signal sequence with the coding rate $k_0/n_0$ and the code constraint length K, is proportional to the value S, which is defined by the following equation (see "Viterbi Decoding for Satellite and Space Communications" by J. A. Heller and I. M. Jacobs, in IEEE Trans. Commun. Technol., vol. COM-19, pp. 835-847, October 1971).

$$S = 2^{K_0(K-1)} \quad (1)$$

The equation (1) shows that the amount of the hardware increases exponentially as the coding rate $k_0/n_0$ and/or the code constraint length K increases. The main reason for that resides in the fact that the number of the internal states and the number of the necessary calculations increase when the coding rate and/or the code constraint length becomes large. Accordingly, a decoding hardware for the code with the coding rate of higher than $\frac{3}{4}$ has been almost impossible.

On the other hand, the improved error correcting technique with the low redundance and the large correcting capability has been desired for the effective use of a communication line, which has the limited frequency band.

SUMMARY OF THE INVENTION

It is an object, therefore, of the present invention to overcome the disadvantages and limitations of a prior error correcting technique by providing a new and improved error correcting technique.

It is also an object of the present invention to provide an error correcting technique having a large error correcting capability with small amount of hardware.

The above and other objects are attained by an error correcting technique having a convolutional coding circuit for performing a convolutional coding with some redundancy to an input data, means for deleting some symbols of the output of said convolutional coding circuit to increase a coding rate close to one, means for inserting dummy symbols into each bit position of a receive data sequence where a symbol has been deleted at a transmit side, means for designating a fixed predetermined likelihood value to said inserted dummy symbol, and maximum likelihood decoding technique for decoding a receive data sequence with said inserted dummy symbols. In a maximum likelihood decoding technique, a likelihood value for the symbols transmitted from a transmit side is calculated in the decoding process itself, and a likelihood value for dummy symbols inserted in a receive side is a fixed and predetermined value.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
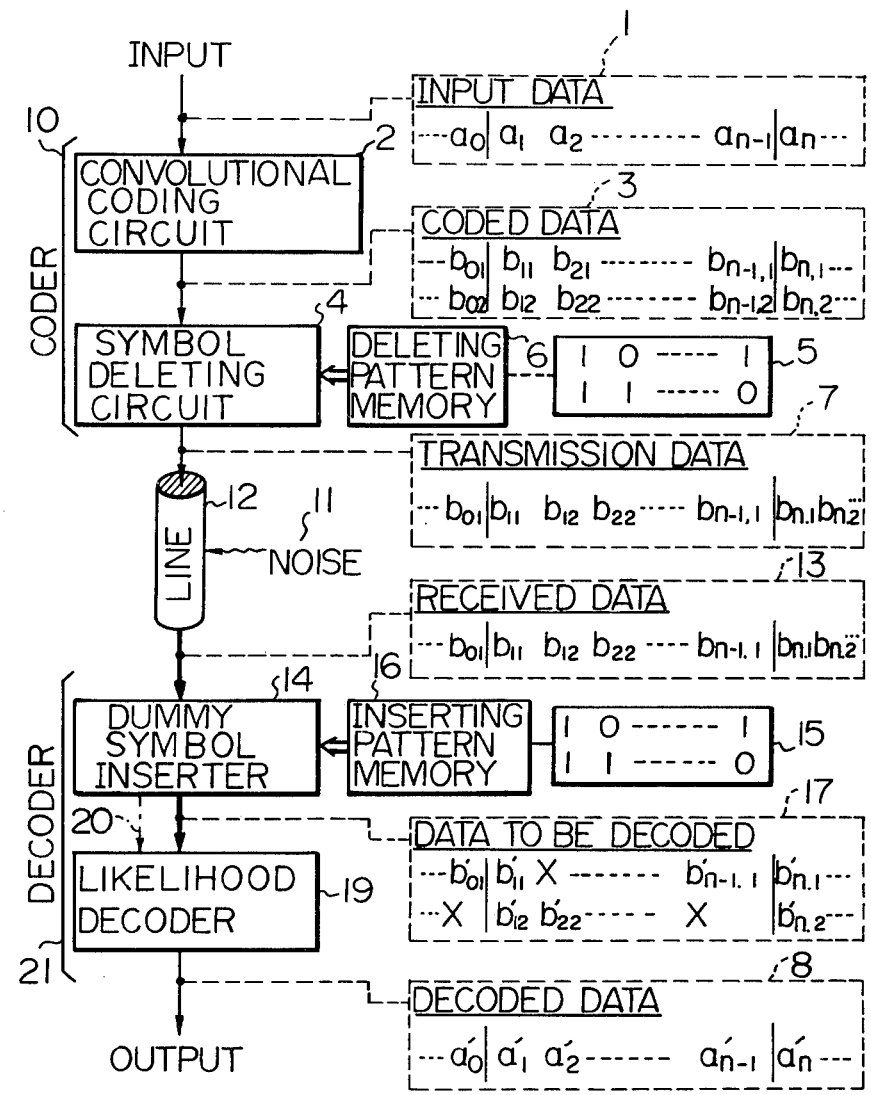
FIG. 1 shows a conceptual diagram of the communication system utilizing the present maximum likelihood error correcting technique.

FIG. 1 shows a conceptual diagram of the communication system utilizing the maximum likelihood error correcting technique according to the present invention. The input data sequence 1 is converted to the coded data 3 by the convolutional coding circuit 2, and said coded data 3 is applied to the symbol deleting circuit 4. The coded data 3 is shown in the table in FIG. 1 for the case that the coding rate of the original code is ½ in the parallel form. The symbol deleting circuit 4 deletes some symbols according to the content of the deleting pattern memory 6 which stores the predetermined deleting pattern 5, and said circuit 4 provides the transmission data sequence 7 which has the predetermined transmission speed. In the deleting pattern 5, the symbol "1" shows that the corresponding input data is not deleted, and the symbol "0" shows that the corresponding input data is deleted. The coder 10 in FIG. 1 performs the above operation and provides the transmission data 7 from the input data sequence 1.

The data 7 is transmitted to the receive side through the communication line 12 in which signal quality is degraded by the noise 11.

In the receive side, the received data 13 corresponding to the transmitted data 7 is obtained either through the hard decision scheme or the multi-level soft decision scheme. The soft decision scheme provides not only the conventional decoded symbol (1 or 0), but also the reliability of each decoded symbol, and then, in case of the 8-level soft decision, each decoded symbol is composed of 3 bits. As described before, said soft decision scheme together with the maximum likelihood decoding technique improves remarkably the error correcting capability.

The received data 13 is entered into the dummy symbol inserter 14, in which a dummy symbol is inserted in each bit position where a symbol was deleted in the transmit side, according to the content of the inserting pattern memory 16. Thus, the transmission speed of the data 17 which is the output of the dummy symbol inserter 14 is the same as that of the coded data sequence 3. A dummy symbol may either be 1 or 0. In case of a soft decision system, each dummy symbol has of course a plurality of bits. The pattern "x" in the data 17 in FIG. 1 shows the dummy symbol thus inserted. The data 17 is applied to the maximum likelihood decoder 19, which is implemented by the Viterbi decoding circuit in the present embodiment. In this case, a dummy symbol must have a fixed likelihood value (so-called "metric") for easy error correcting calculation hereinafter. Therefore, the dummy symbol inserter 14 provides an additional pulse 20 which prohibits the maximum likelihood calculation to a dummy symbol is a decoder 19.

The maximum likelihood decoder 19 may be a conventional Viterbi decoder corresponding to a convolutional circuit at a transmit side, except that a likelihood calculation is not performed for each inserted dummy symbol, but a fixed likelihood value is appointed when a pulse 20 which prohibits a likelihood calculation is received from a dummy symbol inserter 14. Therefore, the maximum likelihood (Viterbi) decoding operation is performed by appointing a fixed predetermined likelihood value to a dummy symbol, and then, the decoded data sequence 8 is obtained as the output of the likelihood decoder 19. The decoder 21 performs the above mentioned operation to provide a decoded data 8 from a received data 13.

Now, the coding rate of the present invention is described.

Assuming that the coding rate of the convolutional coding circuit 2 is $k_0/n_0$, and the deleting pattern 5 deletes m symbols in each L blocks each of which has $n_0$ symbols, then, the coding rate of the input data 1 to the transmission data 7 is shown below.

$$K_0'/n_0' = (k_0L)/(n_0L - m) \qquad (2)$$

Accordingly, the coding rate of the resultant code according to the present invention is either equal to $k_0/n_0$ (in case of m=0), or higher than that value. And, by suitably choosing the values of L and/or m in the equation (2), any desired coding rate higher than $k_0/n_0$ and close to 1 is obtained for performing the maximum likelihood error correction.

The error correcting capability, or the bit error rate of a decoded data according to the present invention depends upon the deleting symbol rate ($m/(n_0L)$) designated by the deleting symbol pattern 5, and the position of the m number of the deleted symbols.

It is assumed here that the convolutional coding circuit 2 in the coder 10 in FIG. 1 handles the convolutional code with the coding rate ½ and the code constraint length 7, for instance. It should be noted that a Viterbi decoder for that code has already been realized at present. The desired optimum deleting pattern for providing the code with the coding rate higher than ½ for the maximum likelihood error correction, is obtained by calculating the distance between each codeword for all the possible deleting patterns 5 by using a computer, and by selecting one deleting pattern which gives the best error performance, for each given coding rate. The table 1 shows the best deleting pattern, in which the original code has the coding rate ½ and the code constraint length 7, and the resultant coding rate is ⅔ through ⅞. In the table, the deleting pattern is shown in the parallel form after ½ coding operation. Therefore, when a pattern is shown in a serial form, it is shown as "111001" for a ¾ code, for instance.

TABLE 1

| Coding rate (n-1/n) | L | m | Optimum deleting pattern | d | $C_k$ |
|---|---|---|---|---|---|
| ½ | 1 | 0 | 1 (original code) 1 | 10 | 36 |
| ⅔ | 2 | 1 | 11 10 | 6 | 3 |
| ¾ | 3 | 2 | 110 101 | 5 | 42 |
| 4/5 | 4 | 3 | 1111 1000 | 4 | 12 |
| 5/6 | 5 | 4 | 11010 10101 | 4 | 92 |
| 6/7 | 6 | 5 | 111010 100101 | 3 | 5 |
| ⅞ | 7 | 6 | 1111010 1000101 | 3 | 9 |

In the above table, L and m indicate that m bits in the L number of blocks (2L symbols) after ½ coding are deleted periodically. The table also shows the minimum distance d for each code, and the total number $C_k$ of the error bits in all the incorrect paths which have the distance d from the correct path. It has been known in general that the bit error performance of the output data sequence of a Viterbi decoder is better when d is larger, and when d is fixed that error rate performance is better as $C_k$ is smaller. Accordingly, it is apparent that as the coding rate is larger (that is to say, as the deleting rate of ½ coded symbol is larger), the bit error rate performance of the Viterbi decoding is worse.

Figure 2:
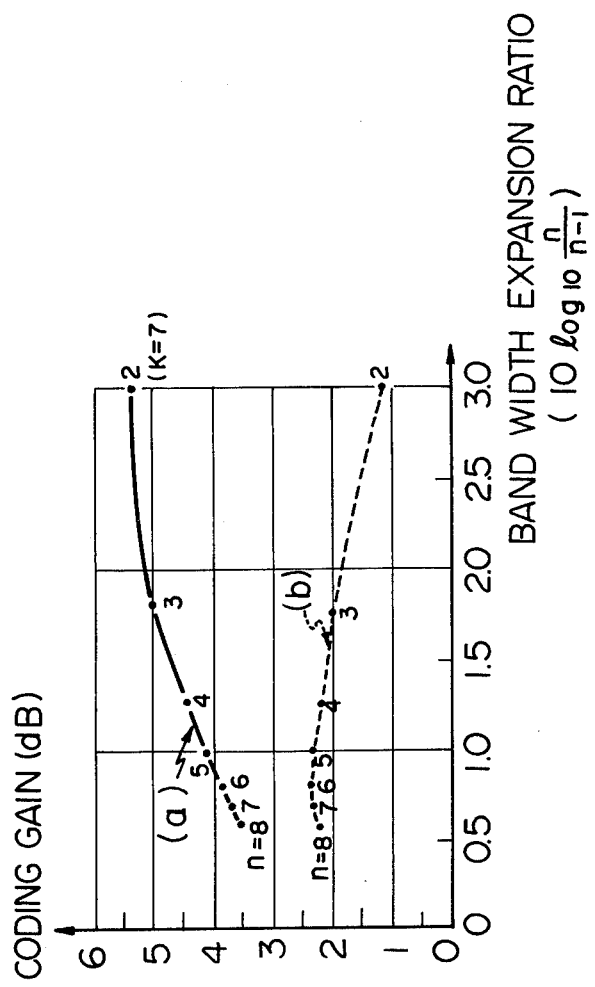
FIG. 2 shows the curve (a) of the coding gain of the (n−1)/n convolutional codes at the bit error rate of $10^{-6}$ in case of the 8-level soft decision decoding based on the invented error correcting technique, in which an original code has the coding rate $\frac{1}{2}$ and the code constraint length 7, together with the curve (b) of that of conventional double error correcting self-orthogonal codes.

FIG. 2 shows the calculated curve (curve a) of the coding gain at the obtained bit error rate $10^{-6}$ in an 8-level soft decision Viterbi decoding, together with that (curve b) of a conventional double error correcting self-orthogonal code. In FIG. 2, the horizontal axis shows the decibel value (dB) of the band width expansion ratio of each of the codes (which is the inverse number of the coding rate $n-1/n$). The coding gain is defined as the difference of $E_b/N_0$ ($E_b$ is an energy per each information bit, and $N_0$ is a single sided noise power density) with no coding, and that value ($E_b/N_0$) with coding, keeping the information transmission speed constant. It is apparent in FIG. 2 that the coding gain of the present invention is higher than that of a conventional double error correcting self-orthogonal code, when the present error correcting technique is combined with the 8-level soft decision scheme. For instance, in the case of ⅞ code, the coding gain of the present invention is superior to a conventional coding by 1.3 dB at the bit error rate $10^{-6}$. Thus, it is quite clear that the present invention provides the excellent bit error rate performance even for the high rate code.

When a hardware for a convolutional coding circuit and a Viterbi decoding circuit for a code with a coding rate higher than ½ and the code constraint length larger than 7, is realized in future, due to the development of LSI (large scale integrated circuit), the error correcting capability will be further improved than those shown in FIG. 2.

Figure 3:
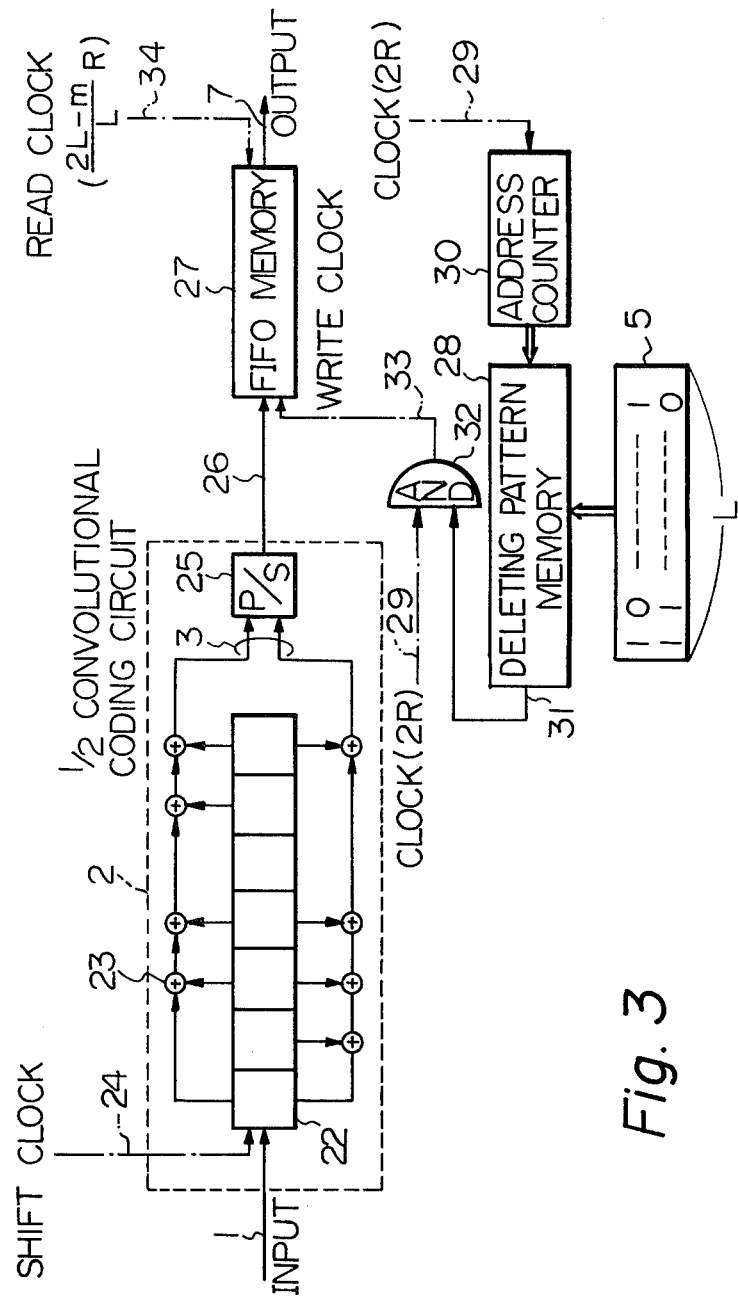
FIG. 3 is a block diagram of the encoder according to the present invention.

FIG. 3 shows a block diagram of a coding circuit 10, in which a convolutional coding circuit 2 handles a code with the coding rate ½ and the code constraint length 7. The convolutional coding circuit 2 is composed of a shift register 22 with seven bit stages and an exclusive-OR circuit 23. The shift clock 24 with the speed R is supplied to the circuit in the case that the transmission speed of the input data series is R. The parallel-serial converter 25 converts the parallel data 3 to a serial data 26, which is fed into the first-in-first-out memory (FIFO) 27. The deleting pattern memory 28 which stores the deleting pattern 5 set from an external circuit (not shown) sends the contents of the memory bit by bit according to the indication pulse from the address counter 30 which operates with the clock pulse 29 having the speed 2R. The address counter 30 designates the address of the deleting pattern memory 28 which stores the deleting symbol pattern 5 in the length of L blocks (having the 2L number of symbols), periodically.

The AND gate 32 provides the logical product of the output signal 31 from the deleting pattern memory 28 and the continuous clock signal 29 with the speed 2R, and the output clock 33 of the AND gate 32 with some clock pulses deleted is applied to the FIFO memory 27 as a writing clock pulse. Accordingly, the FIFO memory 27 stores the coding data 26 only when the write clock pulse 33 is applied to that FIFO memory 27. When the deleting pattern 5 shows that the deleting period is L blocks, and the number of deleting symbols is m, the read clock 34 for reading data from the FIFO memory 27 has the speed of $((2L-m)/L)R$. Then, the data speed is converted to $((2L-m)/L)R$ in the FIFO memory, and the output data of the FIFO memory is provided as the transmission data sequence 7.

Figure 4:
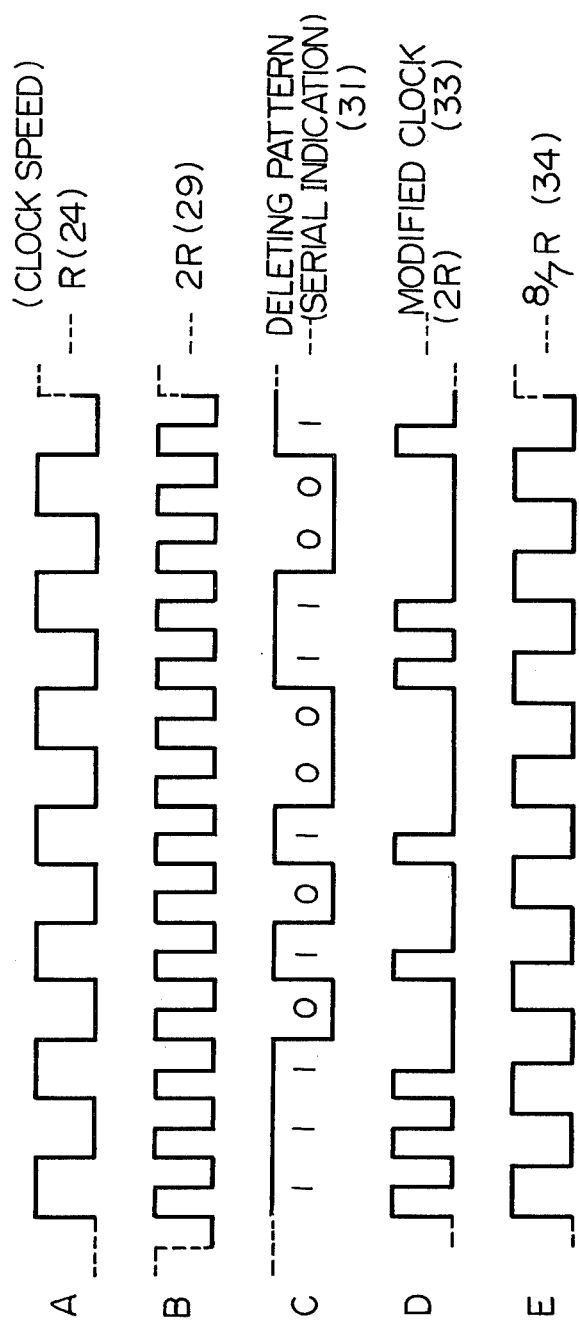
FIG. 4 shows a timing chart of the clock signals for operating the device of FIG. 3 in the case of coding rate $\frac{7}{8}$, and FIG. 5 comprised of FIGS. 5A and 5B is a block diagram of the decoder according to the present invention.

FIG. 4 shows the timing chart of the clock pulses utilized in FIG. 3 for the ⅞ code ($L=7$, $m=6$, and then $2L-m/L=8/7$) of the previously mentioned table 1. In FIG. 4, the signal (A) shows the clock pulse 24 with the speed R, (B) shows the clock 29 with the speed 2R, (C) shows the output signal 31 of the deleting pattern memory 28 when the deleting pattern 5 is read in a serial mode, (D) shows the semi-deleted clock 33 which is the logical product of the (B) and the (C), and (E) shows the read clock 34 with the speed 8/7 R.

Figure 5B:
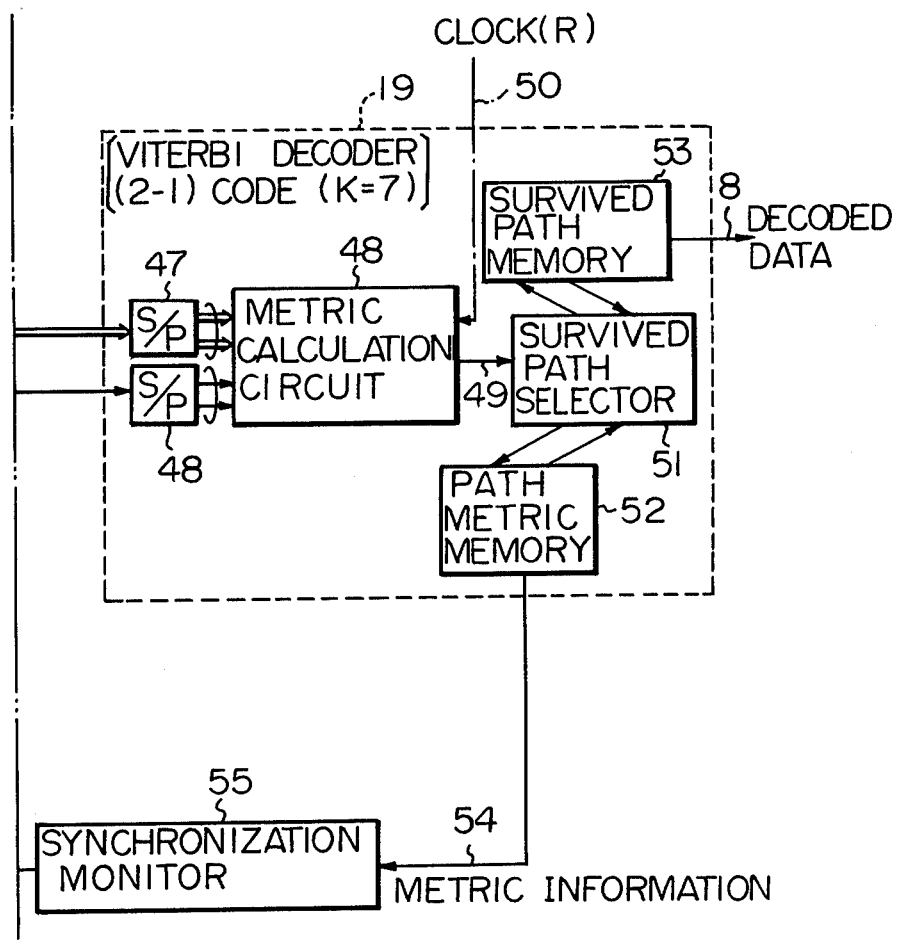

FIG. 5 shows a block diagram of a decoder 21 which corresponds to a coder 10 of FIG. 3. The decoder 21 operates in the opposite manner of the transmit side. Thus, the decoder inserts a dummy symbol at the position where a code symbol is deleted in the transmit side, to generate the data with the speed 2R which is the same as the speed of the output data from the coding circuit 2. Then, the maximum likelihood decoding is performed by the Viterbi decoder 19 for the ½ convolutional code (code constraint length is 7). It is assumed that the received data sequence 13 is a soft decision data, and the Viterbi decoder 19 is capable of calculating the likelihood or the metric for the soft decision input data.

The received data 13 is stored in the FIFO memory 36 with the write clock pulse 35 with the pulse speed $((2L-m)/L)R$. An inserting pattern memory 37 which stores the inserting pattern 15 corresponding to the deleting pattern 5 in the transmit side which provides the content of the same, the address of which is designated by the address counter 39 with the clock pulse 38 of the speed 2R. The address counter 39 functions to designate periodically the address of the inserting pattern memory 37, which stores the inserting pattern 15 each having L length of blocks. The AND gate 41 provides the logical product of the output signal 40 of the inserting pattern memory 37 and the continuous clock signal 38 with the speed 2R, and provides the semi-deleted output clock pulse 42, which has no active pulse on some bit positions. The output clock pulse 42 is applied to the FIFO memory 36 as a read clock pulse, and a data is read out from the FIFO memory 36, synchronized with that clock pulse 42.

The output signal 40 of the inserting pattern memory 37 operates further to steer a switch 43, which couples the output line 17 either with the output of the FIFO memory 36, or the output of the dummy data memory 44. The switch 43 couples the output line with the FIFO memory 36 when a data is read out from the FIFO memory 36, and couples the output line 17 with the dummy data memory 44 when the dummy data should be inserted into a received data. The output 17, which is the input signal to be decoded, is fed into the Viterbi decoder 19. The output 40 of said inserting pattern memory 37 is also applied to the Viterbi decoder 19 through the sign inverter 45 as the inhibit pulse of the metric calculation for an inserted dummy symbol.

The Viterbi decoder 19 has a metric calculation circuit 48, which receives the input data 17 through a first serial-parallel converter 47, and the inhibit pulse 20 through the second serial-parallel converter 48, for performing the metric calculation for the input signal. The metric calculation circuit 48 operates providing a predetermined fixed metric value to the inserted dummy symbol which is supplied simultaneously with the metric calculation inhibit pulse 20. When the metric calculation is inhibited, the metric calculation circuit 48 may give the same metric value to both the data "1" and "0" to reduce the influence to a maximum likelihood path selection function in a Viterbi decoding, alternatively, said metric calculation circuit 48 may give the intermediate value between the maximum symbol metric value and the minimum symbol metric value in order to minimize the influence to the self synchronization function (which is described later).

The metric value 49 calculated in the circuit 48 is transferred to the survived path selector 51 by the clock pulse 50 having the speed R. The survived path selector 51 selects the survived path for each internal states according to the content of the path metric memory 52 which stores the path metric value of the survived path until that time for each internal state of a code, the content of the survived path memory which stores the bit sequence of each survived path, and the metric value 49 at that time, then, said survived path selector 51 revises the path metric memory 52 and the survived path memory 53. The survived path memory 53 provides the decoded data 8 with some delay time which is determined by the length of the truncation path. The decoding procedure in the circuit 19 is described in detail in "The Viterbi Algorithm" by G. D. Forney, JR., in Proceedings of the IEEE. Vol-61, No. 3, March 1973, pp. 268-276. The length of the truncation path in the survived path memory 55 in the decoder 19 increases as the coding rate becomes high, for instance, in the case of ¾ code in the Table 1 said length is about 60 bits, and in the case of ⅞ code in said Table 1 the length is about 100 bits.

When the present decoder handles a continuous data, in order to assure the correct position of a dummy symbol to be inserted into a received data sequence 13, the self synchronization function to every period of a deleting pattern is necessary. The self synchronization in a receive side is performed as follows, for example.

Generally speaking, in a synchronized condition, when a signal to noise ratio exceeds a predetermined threshold value, the metric value in Viterbi-decoding process is enough large for the particular path, but that metric value is considerably small for other paths. On the other hand, in an asynchronous condition, tne metric value in all the paths becomes almost constant medium value. Accordingly, the metric information which shows the grade of the synchronization of a code can be produced in a Viterbi decoder according to the metric values in each path. For that purpose, the metric information 54 produced in the path metric memory 52 is transferred to the synchronization monitor 55, which produces an address control pulse 56 to the address counter 39 when the metric value 54 is out of range of the synchronization. The address counter 39 shifts the address of the inserting pattern memory 37 by one symbol upon receipt of said address control pulse 56. The synchronization monitor 55 repeats said control operation for every predetermined time interval until the metric value 54 reaches a synchronization range. Thus, the receive side can automatically monitor the asynchronous status, and recover the synchronization status.

The timing chart or the phase of the clock pulses utilized in the apparatus of FIG. 5 is similar to those of FIG. 4.

Although the above embodiment handles only a serial continuous data, a parallel and/or burst data with predetermined speed may also be handled by the present apparatus.

As described above, according to the present invention, a maximum likelihood error correction for a high rate code can be realized with reasonable hardware amount. Further, the error correcting capability is improved by using a soft decision decoding technique. Then, the signal quality of a digital communication system is improved.

The present error correcting technique has the advantage that the coding rate of a resultant code can be determined only by the deleting pattern. Therefore, an adaptive error correction system which selects the proper coding rate according to the instantaneous channel condition may be possible, and then, the system design of a digital communication system may have much feasibility.

From the foregoing, it will now be apparent that a new and improved error correcting technique has been found. It should be understood of course that the embodiment disclosed is merely illustrative and is not intended to limit the scope of the invention. Reference should be made to the appended claims, therefore, rather than the specification as indicating the scope of the invention.

What is claimed is:

1. A coder for minimum likelihood error correcting technique in a digital communication system in which a transmit side encodes original data through convolutional coding with some redundancy, and a receives side decodes received data through maximum likelihood decoding, comprising:
   (a) a convolutional coding circuit means for performing a convolutional coding of input data;
   (b) a deleting pattern memory storing a deleting pattern which designates symbols to be deleted in output data of said convolutional coding circuit means; and
   (c) a code deleting circuit means for deleting symbols in output data of said convolutional coding circuit means according to the content of said deleting pattern memory, to provide transmission data having a predetermined speed and a coding rate close to 1.

2. A decoder for a maximum likelihood error correcting technique in a digital communication system in which a transmit side encodes original data through a convolutional coding with some redundancy and deletes some symbols thus encoded according to a predetermined deleting pattern to increase a coding rate close to 1, and a receive side decodes received data through a maximum likelihood decoding, comprising:
   (a) an inserting pattern memory storing an inserting symbol pattern which corresponds to a deleting pattern in a transmit side;
   (b) a dummy symbol inserter means for inserting a dummy sysmbol into a received signal at each proper bit position where a code is deleted in a transmit side, according to the content of said inserting pattern memory; and
   (c) a maximum likelihood decoder which decodes a received signal through a calculation of metric, in which a conventional metric calculation is not performed for a dummy symbol inserted in said dummy symbol insert means and a predetermined fixed likelihood value is designated to a dummy symbol irrespective of its value.

3. A coder according to claim 1, wherein a coding rate of an original data is ½ and a coding rate of a resultant code after deleting is in the range between ⅔ and ⅞.

4. A decoder according to claim 2, wherein the fixed likelihood value for a dummy data is in the range between the maximum symbol metric value for a soft decision data and the minimum symbol metric value for a soft decision data.

* * * * *